Jan. 11, 1949.   R. B. MENTZER   2,458,913
METHOD OF PALLET STONE CUTTING AND POLISHING
Filed June 19, 1946                 2 Sheets-Sheet 1
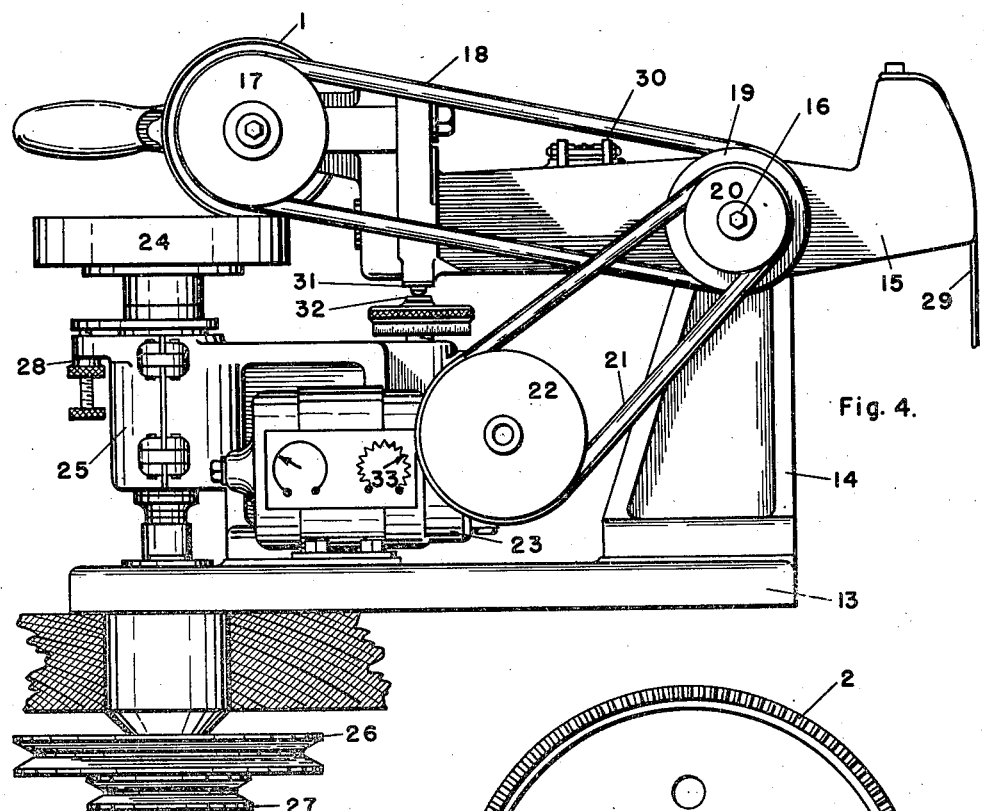
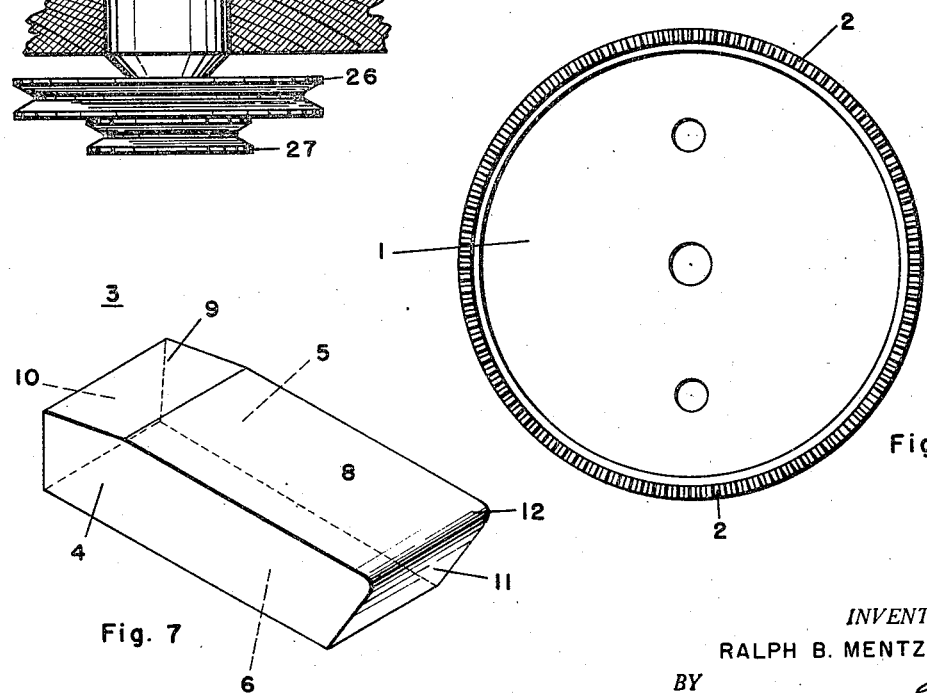
INVENTOR.
RALPH B. MENTZER
BY
*Murray W. Gould*
ATTY.

Jan. 11, 1949.                R. B. MENTZER                2,458,913
            METHOD OF PALLET STONE CUTTING AND POLISHING
Filed June 19, 1946                              2 Sheets-Sheet 2
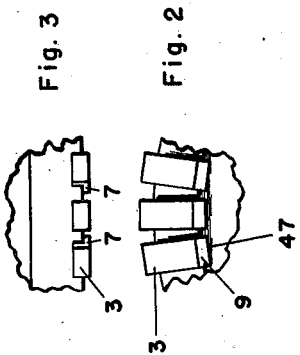
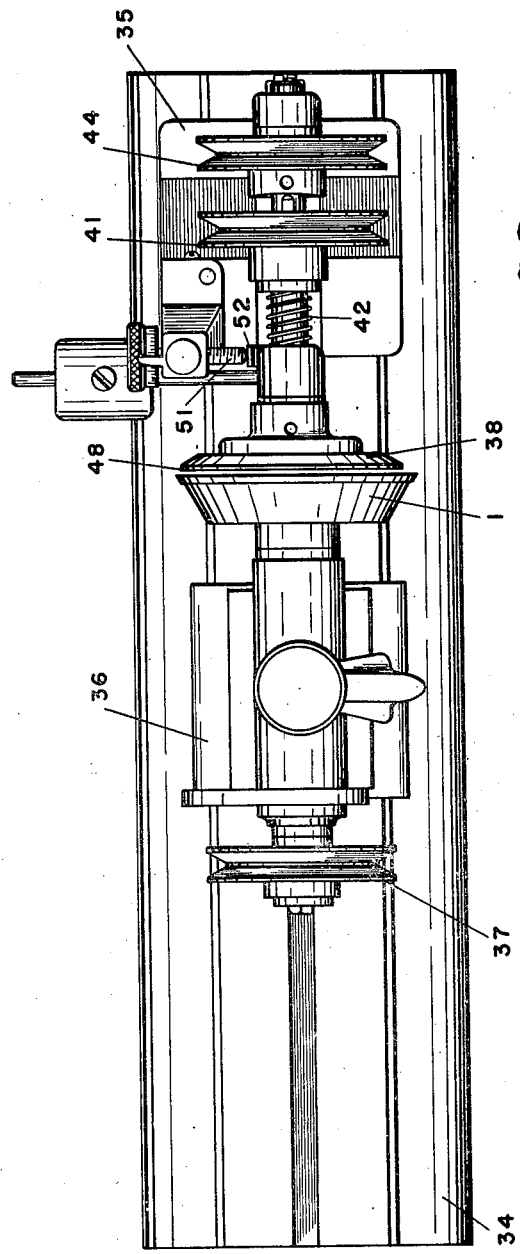
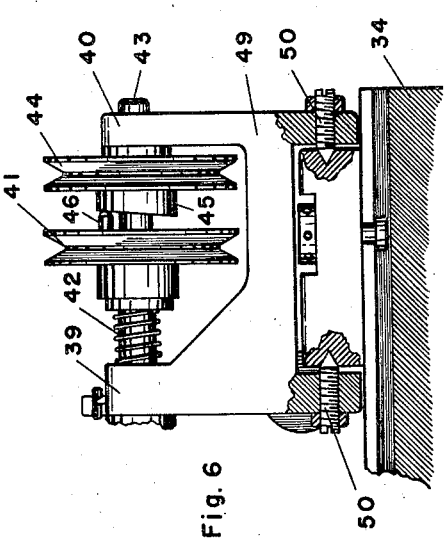
INVENTOR.
RALPH B. MENTZER
BY
*Murray W. Gould*
ATTY.

Patented Jan. 11, 1949

2,458,913

UNITED STATES PATENT OFFICE 2,458,913

METHOD OF PALLET STONE CUTTING AND POLISHING

Ralph B. Mentzer, Lancaster, Pa., assignor to Hamilton Watch Company, Lancaster, Pa.

Application June 19, 1946, Serial No. 677,642

1 Claim. (Cl. 51—283)

This invention relates to a method for finishing pallet stones and particularly to the method of supporting the pallet stones in a position to be worked upon.

Pallet stones for watches are usually finished on eight different surfaces, five of which are accomplished without resetting while in this especial holder. This is particularly important as the pallet stones themselves are so small as to make it necessary to mount them in shellac or some holding medium in order to work on the surfaces. The advantage of being able to finish as many surfaces as possible while holding the pallet stone in identically the same position is therefore apparent.

The object of this invention is to provide a holder for a plurality of pallet stones and which will retain said stones during finishing of the critical surfaces of the stones.

A further object of the present invention is to provide a holder for a plurality of pallet stones in which each stone is engaged by the surfacing machine at exactly the same angle as a similar stone in a different position in the holder.

A still further object of the present invention is to provide a holder in which surface finishing of at least five surfaces of a pallet stone without removal from the holder and without forming surface markings on the finished surfaces of said stones is possible.

A still further object of the present invention is to provide a holder for a plurality of pallet stones which will support the stones in a position to be worked upon by the machine to produce identical finished surfaces on the stones.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawings in which:

Figure 1 is a top plan view of the holder.

Figure 2 is a detail of the holder greatly enlarged.

Figure 3 is an end view of the same detail as illustrated in Figure 2.

Figure 4 is a side elevation of one of the machines showing the stones mounted in the holder in contact with the lap.

Figure 5 is a top plan view of a different lapping machine.

Figure 6 is an end view partly in section of the lapping machine shown in Figure 5.

Figure 7 is an enlarged perspective view of a pallet stone.

The holder which constitutes the invention is substantially a flat disc 1 having a plurality of radial stalls 2 directly adjacent the periphery of said disc, which stalls are adapted to receive and support a plurality of pallet stones 3 which are held in their respective stalls through the medium of an adhesive such as shellac. While held in the stalls the stones present five faces which can be surfaced without being removed from the holder 2. Two of these operations are shown in Figures 4, 5 and 6, the other operations being accomplished on conventional equipment.

Referring particularly to Figure 7 which is an enlarged view of a pallet stone and shows the surfaces which are finished while in the holder forming the subject of this invention. In Figure 7 the angles are slightly exaggerated in order to better explain their significance and the purpose accomplished by the cutting and finishing of the surfaces.

Sides 4 and 5 as well as the bottom 6 engage the sides and bottom of the holder stalls and are thoroughly held by shellac, the sides of the stalls 7 being sufficiently low to allow the top edge 8 to project considerably above the sides of the stalls. This permits the grinding and polishing of the lead angle 9. The back end 10 and the front end 11 project beyond the stalls to permit engagement with the grinding wheel or lap. The rounded surface 12 of the front end 11 is formed by holding a lapping medium against that edge while rotating the holder.

In the making of identical parts for watches so that like parts may be freely interchanged the slightest deviation in the dimensions of the pallet stone would seriously affect the running of the watch. It is therefore necessary that the distance between the back face 10 and the front face 11 be accurate and that the angle of the front face 11 with the bottom 6 and the top 8 be absolutely accurate. The sloping section 9 or lead angle is of no particular degree being used to permit the insertion of the stone in the pallet fork, the slightly less thickness at the back 10 making the insertion easier. The rounded edge 12 is formed to permit the watchmaker to use a tool against this edge to press the pallet stone into the fork. If this edge were sharp the pushing tool might possibly chip and so mar the finished product.

Referring particularly to Figures 4, 5 and 6, special types of machines are here shown for two of the grinding operations. Considering the machine shown in Figure 4 first, a base 13 supports a standard 14 which has pivotally mounted thereon a rocking arm 15 on the axis 16. Mounted for rotation at the end of this arm is the holder 1 which is driven through the pulley 17, belt 18, pulleys 19 and 20, belt 21 and pulley 22, which in turn is driven by the control motor 23.

The motor 23 is controlled by means of an oscillating rheostat 33 which drives the motor at continuously varying speeds so that there will be no pattern formed during the polishing operation between the pallet stones and the lap 24.

A lap 24 mounted for rotation in the vertical bearing 25 is driven at varying speeds through pulleys 26 or 27 which in turn are driven by a motor not here shown. Micrometric means 28 for adjusting the level of the lap 24 is attached to the bearing 25 and serves to properly position the lap with regard to the holder 1.

The rocking arm 15 which supports the holder 1 at one end and a counter balancing weight (not shown) attached to the ribbon 29 carries a level 30 to assist in adjusting the relative positions of the holder and lap 24. An electrical contact 31 is adapted to close an electric circuit through contact 32 which is micrometrically adjustable upon the completion of the grinding operation.

Referring particularly to Figures 5 and 6, a somewhat similar machine used for another one of the operations is shown mounted on a base 34 upon which two slide members 35 and 36 are carried. The member 36 rotatably supports the holder 1 which is mounted on a shaft connected to a pulley 37, which is driven by means of a belt and motor not shown. The lap 38 is mounted for rotation in the bearings 39 and 40 and is driven by means of the pulley 41 through a belt and motor (not shown). The pulley 41 is mounted on a sleeve 42 which is in turn carried by the shaft 43. Freely mounted on the shaft 43 is a pulley 44 having an integral cam surface 45 which engages a pin or cam follower 46 carried by the pulley 41. Continued rotation of the pulley 44 by means of a belt and motor (not shown) causes movement of the lap 38 axially of the shaft 42, which moves the lap a small fraction against the edges 47 of the stones mounted in the holder 1, the edge 48 of the lap moving laterally across the face of the stones during the operation to prevent the formation of grinding lines or polishing lines on the stones.

The entire bearing assembly 49 is pivoted on the screws 50, the preponderance of weight being such that the lap is urged in the direction towards the micrometric screw 51. Contact of the point 52 with the screw 51 will complete an electrical circuit and flash a signal at the completion of the operation.

What is claimed is:

A method of finishing pallet stones of substantially parallelepiped form consisting in mounting a plurality of unfinished stones on radial lines so that the sides of adjacent stones are substantially parallel, cutting all of said stones by engagement with a diamond lap to a predetermined length in a single operation, surface polishing the top and exposed surface of said stones in another single operation, angle cutting the free end of said stones to a surface conforming to a section of a conical surface, polishing all of said angled cut ends in a single operation, buffing the uppermost outer edge of all of said stones with a resilient diamond lap and polishing the inward end of the top surface of all of said stones to form a lead angle in still another operation.

RALPH B. MENTZER.

REFERENCES CITED

The following references are of record in the file of this patent:

UNITED STATES PATENTS

| Number | Name | Date |
|---|---|---|
| 559,842 | Buckland | May 12, 1896 |
| 628,544 | Macdonald | July 11, 1899 |
| 773,612 | Wallace et al. | Nov. 1, 1904 |
| 1,205,696 | Beck et al. | Nov. 21, 1916 |
| 1,221,858 | Hollands | Apr. 10, 1917 |
| 1,874,536 | Irwin | Aug. 30, 1932 |
| 2,057,303 | Gstyr | Oct. 13, 1936 |
| 2,246,503 | Carlsen | June 24, 1941 |
| 2,352,551 | Kende et al. | June 27, 1944 |

FOREIGN PATENTS

| Number | Country | Date |
|---|---|---|
| 94,967 | Germany | Nov. 12, 1847 |